Dec. 21, 1954 D. E. HOWES 2,697,780
PULSE RECEIVER
Filed Feb. 18, 1946
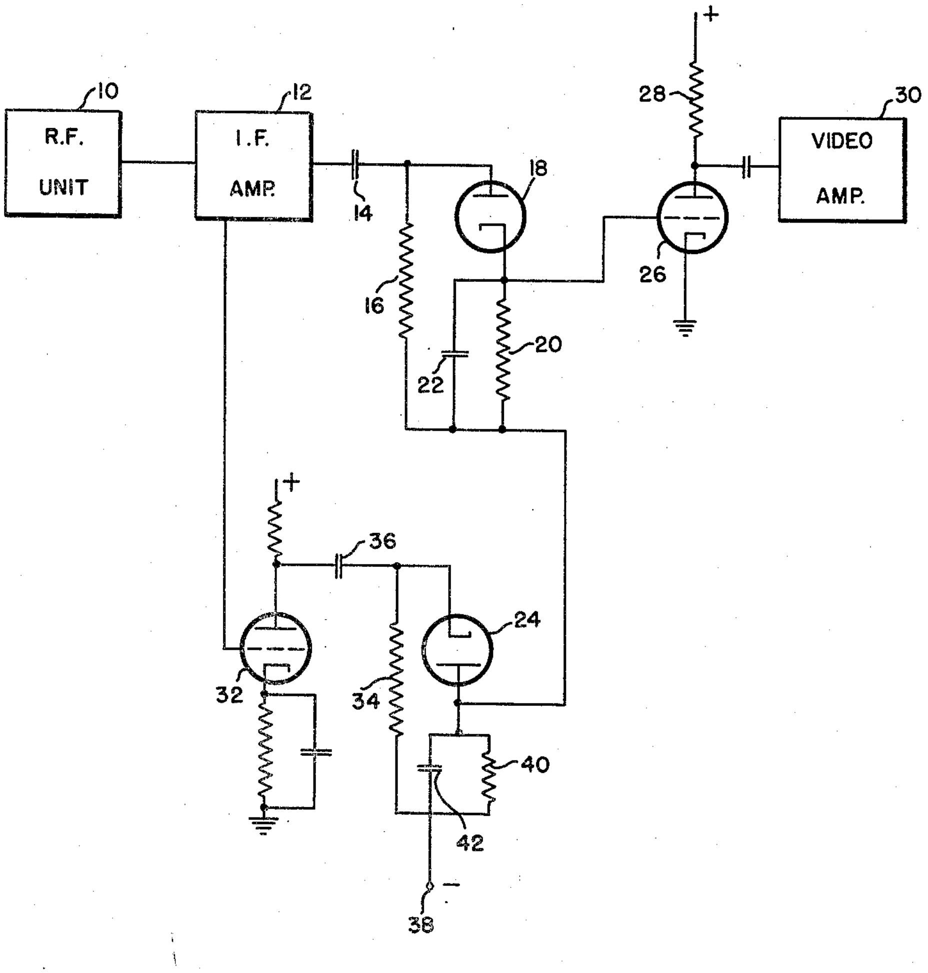
INVENTOR.
DOUGLAS E. HOWES
BY
William D. Hall.
ATTORNEY United States Patent Office 2,697,780

Patented Dec. 21, 1954

2,697,780

PULSE RECEIVER

Douglas E. Howes, Northfield, Vt., assignor to the United States of America as represented by the Secretary of War Application February 18, 1946, Serial No. 648,540

2 Claims. (Cl. 250—8)

This application relates to electrical circuits and more particularly to automatic control circuits for radio receivers. Radio receivers have been designed that will search a given band of frequencies to determine if any radio transmitters are operating in this range of frequencies. Under certain conditions it is desirable to have an output from the search receiver when only pulse signals are received at the antenna, and to cause the output of the receiver to be zero when continuous wave signals are additionally received.

It is an object of the present invention, therefore, to provide a circuit that will cause the output of a radio receiver to be zero when continuous wave signals are received, without interfering with the normal reception of pulse signals.

For a better understanding of the invention, together with other and further objects thereof, reference is had to the following description taken in connection with the accompanying drawing in which the sole figure is a schematic drawing of the invention.

Referring now more particularly to the drawing, there is shown a radio frequency unit 10 electrically connected to an intermediate-frequency amplifier 12. Radio frequency unit 10 and intermediate frequency amplifier 12 may be any of the conventional circuits known in the art, it being understood that radio frequency unit 10 contains an antenna or other means for receiving electromagnetic signals transmitted from a distant station. Intermediate frequency amplifier 12 is connected, by means of a resistor-capacitor coupling network comprising capacitor 14 and resistor 16, to the anode of a diode vacuum tube 18. The cathode of tube 18 is connected through the parallel combination of resistor 20 and capacitor 22 to the anode of a second diode vacuum tube 24. Tube 18, together with resistor 20 and capacitor 22, forms a signal detector circuit for the radio receiver. The cathode of tube 18 is also connected to the control grid of a multi-element vacuum tube 26. The anode of tube 26 is connected through a resistor 28 to a source of positive potential, while the cathode of tube 26 is maintained at ground potential. The signal output from tube 26 present at its anode is connected through a coupling capacitor to a video amplifier 30. It is evident that tube 26, together with its associated circuit elements, forms the first stage of video amplifier 30, and this first video stage is shown in schematic form rather than in block diagram form to better illustrate the operation of the invention. Video amplifier 30 is intended to represent any type of video amplifier, audio amplifier, or other circuit that may suitably follow the first stage of amplification containing tube 26.

A second output from intermediate-frequency amplifier 12 is connected to the control grid of a multi-element vacuum tube 32. Tube 32 is connected in a voltage amplifier stage and, therefore, has an anode load resistor connected between its anode and a source of positive potential. A parallel resistor-capacitor combination is connected between the cathode of tube 32 and ground to provide biasing means for tube 32. The signal output from tube 32 present at its anode is connected by means of a resistor-capacitor coupling network comprising resistor 34 and capacitor 36 to the cathode of tube 24. The end of resistor 34 that is not connected to the cathode of tube 24 is returned to a source of negative potential at terminal 38. Terminal 38 is marked with a minus sign to indicate the polarity of this terminal with respect to ground. The anode of tube 24 is connected to terminal 38 through a parallel network comprising resistor 40 and capacitor 42.

The operation of this invention is as follows: Signals induced in the antenna of the radio receiver are converted to intermediate frequency signals by radio frequency unit 10. These signals are amplified by intermediate frequency amplifier 12, and the output signals are applied to the anode of detector 18. The waveform of the signal produced across resistor 20 is substantially similar to the modulation envelope of the signal initially received by radio frequency unit 10. The time constant of the parallel circuit comprising resistor 20 and capacitor 22 is such that the envelope of pulse signals from intermediate frequency amplifier 12 are reproduced with little distortion. Output signals from intermediate frequency amplifier 12 are also applied to the control grid of the amplifier stage including tube 32. The output of tube 32 is applied to the cathode of detector tube 24, causing the modulation envelope of the signals applied to the cathode of tube 24 to appear across resistor 40. Here, however, the time constant of the parallel circuit comprising resistor 40 and capacitor 42 is such that pulse signals cause no appreciable signal to appear across resistor 40, while continuous wave signals applied to the cathode of tube 24 causes a relatively large signal to appear across resistor 40. The signal applied to the control grid of tube 26 is equal to the algebraic sum of the voltage across resistor 20, the voltage across resistor 40, and the negative bias present at terminal 38. The resultant signal that is applied to the control grid of tube 26 is amplified by the stage containing this tube, and this amplified signal is applied to video amplifier 30 where it is utilized in a manner that depends upon the function to which the receiver system is to be put.

It is evident that when only pulse signals are being received, detector tube 24 has little effect on the system, and the signal applied to tube 26, therefore, is the negative bias at terminal 38 plus the positive going pulses appearing across resistor 20. Under this condition tube 26 is properly biased for amplification. When continuous wave signals are received, however, a voltage exists across resistor 40 of such a polarity that the control grid of tube 26 is sufficiently negative with respect to the cathode to cause plate cutoff in this tube. Any signal that appears across resistor 20 in this instance does not appear in the output of the amplifier stage containing tube 26.

Thus, in the circuit here described, pulse signals pass from radio frequency unit 10 through intermediate frequency amplifier 12 and detector 18 to the video amplifier 30, while continuous wave signals received by radio frequency unit 10 pass through intermediate frequency amplifier 12 to detector 18 but are prevented from reaching video amplifier 30.

While specific circuits and specific types of circuit elements have been described as being used in this invention, it is obvious that substitutions and modifications may be made in the circuit as shown. For example, diode detector tubes 18 and 24 may be replaced with triode or other multi-element tubes operating in a substantially similar manner, or the detector circuits including tubes 18 and 24 might be replaced by other detector circuits performing substantially the same function as the circuit shown. It will be apparent to those skilled in the art that other modifications may be made in the circuit shown without involving change in the manner in which the circuit operates. The circuit shown in the drawing, therefore, should be construed as merely illustrative of what is at present considered the preferred embodiment of the invention.

What is claimed is:

1. In a radio receiver including a radio frequency unit an intermediate frequency amplifier, and a video amplifier, a circuit for passing received pulse modulated signals and excluding received continuous wave signals, said circuit comprising first detecting means having a short time constant network in the output circuit thereof to derive a signal having a waveform substantially similar to the modulation envelope of said received pulse modulated signals, means for connecting the output of said intermediate frequency amplifier to the input of said first detector means, second detector means having a long time constant network in the output circuit thereof to derive a substantial signal output when continuous wave signals are received but substantially no signal output when pulse signals are received, means for applying a portion of the output of said intermediate frequency amplifier to the input of said second detecting means, a source of bias potential, means for serially connecting the outputs of said first and second detectors and said bias source as an input circuit to said video amplifier to effect the cutoff of said video amplifier when the output of said second detector exceeds a given value.

2. A circuit for automatically controlling the output of a pulse signal receiver containing an intermediate frequency amplifier, a first detector and a video amplifier, said circuit comprising a voltage amplifier means, a second detector means, means for connecting a portion of the output of said intermediate frequency amplifier to the input of said voltage amplifier means, means for connecting the output of said voltage amplifier means to the input of said second detector means, said second detector means including means for deriving a bias voltage output proportional to the average intensity of received signals appearing across the output of said intermediate frequency amplifier, and means for connecting the output of said second detector means in series with the output of said first detector as an input to said video amplifier to cut off said video amplifier when said bias voltage exceeds a given value.

References Cited in the file of this patent

UNITED STATES PATENTS

| Number | Name | Date |
|---|---|---|
| 1,905,946 | Mathieu | Apr. 25, 1933 |
| 1,931,866 | Heising | Oct. 24, 1933 |
| 2,034,497 | Travis | Mar. 17, 1936 |
| 2,070,354 | Brand | Feb. 9, 1937 |
| 2,076,814 | Franks | Apr. 13, 1937 |
| 2,152,515 | Wheeler | Mar. 28, 1939 |
| 2,168,874 | Lewis et al. | Aug. 8, 1939 |
| 2,250,132 | Parr, Jr. | July 22, 1941 |
| 2,250,144 | Welty | July 22, 1941 |
| 2,250,596 | Mountjoy | July 29, 1941 |
| 2,252,066 | Dallos | Aug. 12, 1941 |
| 2,275,930 | Torcheox | Mar. 10, 1942 |
| 2,329,570 | Weillenstein et al. | Sept. 14, 1943 |
| 2,361,437 | Trevor | Oct. 31, 1944 |
| 2,404,338 | Worcester, Jr. | July 16, 1946 |
| 2,427,691 | Prichard | Sept. 23, 1947 |
| 2,435,960 | Fyler | Feb. 17, 1948 |